United States Patent [19]

Griesemer

[11] Patent Number: 5,044,666
[45] Date of Patent: Sep. 3, 1991

[54] DEVICE FOR THE INCREMENTAL HEIGHT ADJUSTMENT OF AN ATTACHMENT OR DEFLECTION POINT FOR A SAFETY BELT

[76] Inventor: Albert Griesemer, Dorfwiese 3, D-5438 Westerburg-Gershasen, Fed. Rep. of Germany

[21] Appl. No.: 426,214

[22] Filed: Oct. 25, 1989

[51] Int. Cl.⁵ .............................................. B60R 22/20
[52] U.S. Cl. .................................. 280/808; 248/297.3
[58] Field of Search ............................. 280/801, 808; 248/297.3; 297/468, 483

[56] References Cited

U.S. PATENT DOCUMENTS

| | | | |
|---|---|---|---|
| 4,640,550 | 2/1987 | Hakansson . | |
| 4,711,498 | 12/1987 | Adomeit | 280/808 |
| 4,786,081 | 11/1988 | Schmidt | 280/808 |
| 4,818,023 | 4/1989 | Griesemer | 297/483 |
| 4,840,405 | 6/1989 | Escaravage | 280/808 |

FOREIGN PATENT DOCUMENTS

| | | |
|---|---|---|
| 3618973 | 12/1987 | Fed. Rep. of Germany . |
| 3635480 | 4/1988 | Fed. Rep. of Germany ...... 280/808 |
| 8800419 | 4/1988 | Fed. Rep. of Germany . |
| 2590215 | 5/1987 | France ................................. 280/808 |

Primary Examiner—Charles A. Marmor
Assistant Examiner—Karin Tyson
Attorney, Agent, or Firm—Cushman, Darby & Cushman

[57] ABSTRACT

A device for the incremental positioning or height adjustment of an attachment or deflection point for a safety belt includes a guide bar, an adjustment element and a spring element. In accordance with the invention, it is intended to employ a leaf spring as the spring element, which extends over the length and width of the adjustment element and which is, together with the adjustment element, combined into a module clamped to the guide bar. The leaf spring assists in locking, supporting and guiding of the adjustment element.

5 Claims, 6 Drawing Sheets

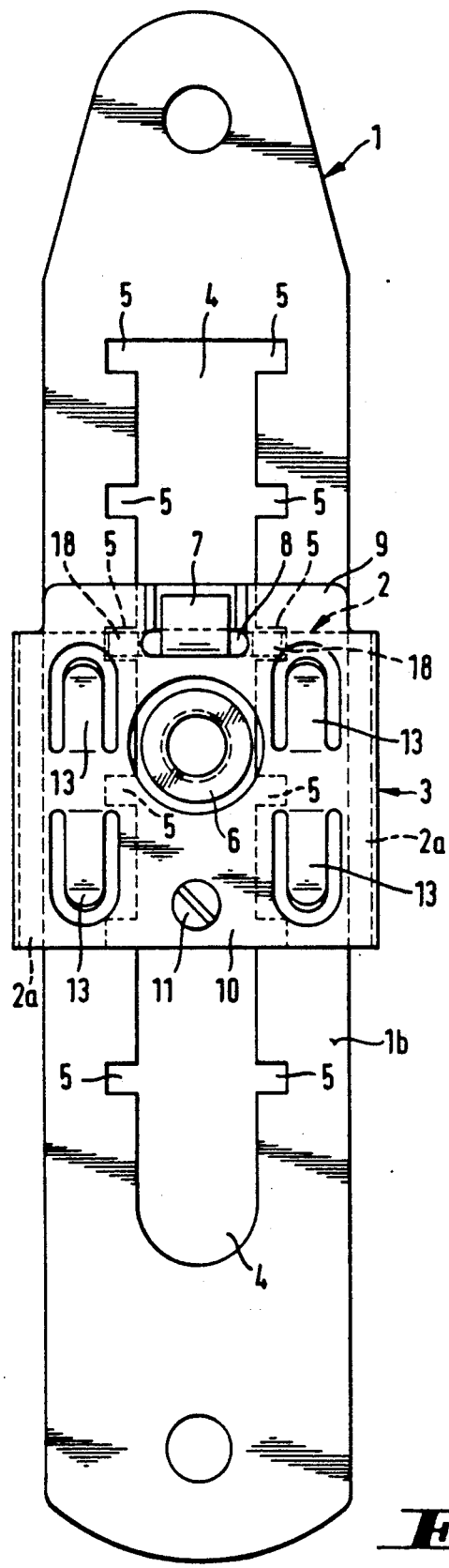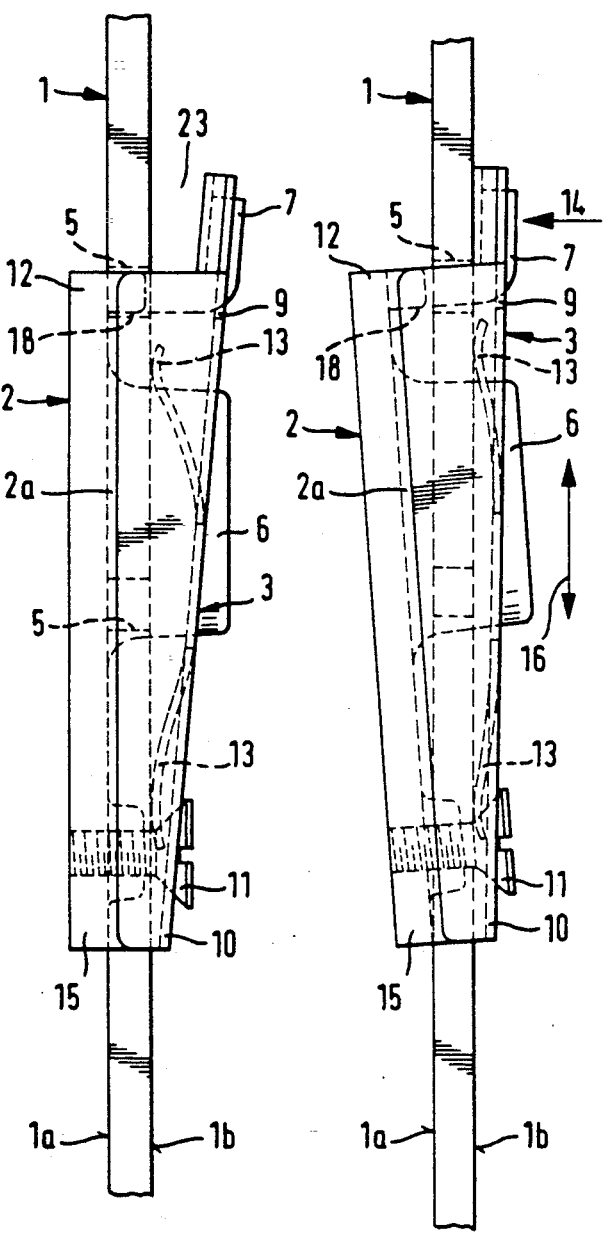
Fig. 1  Fig. 2a  Fig. 2b

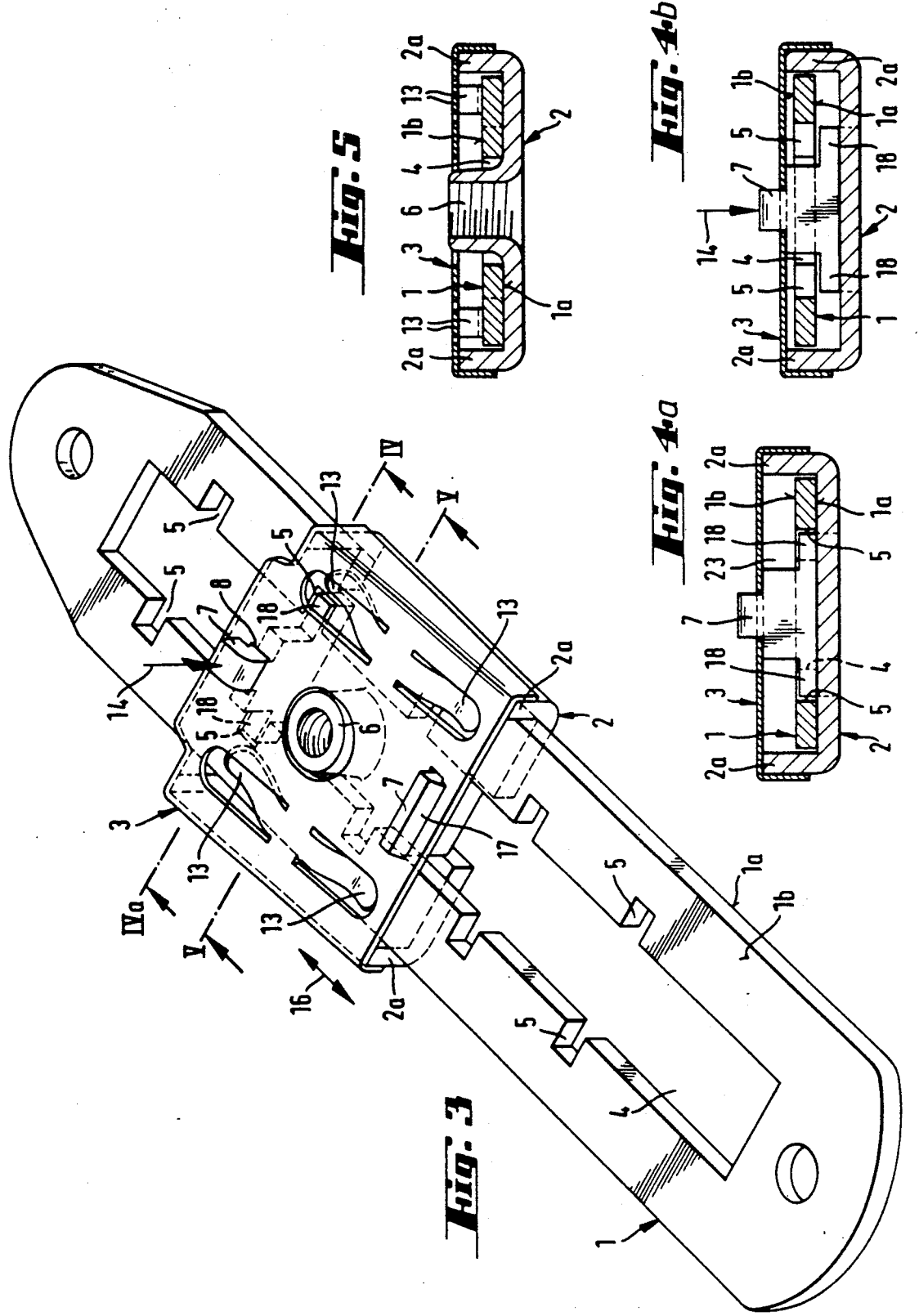

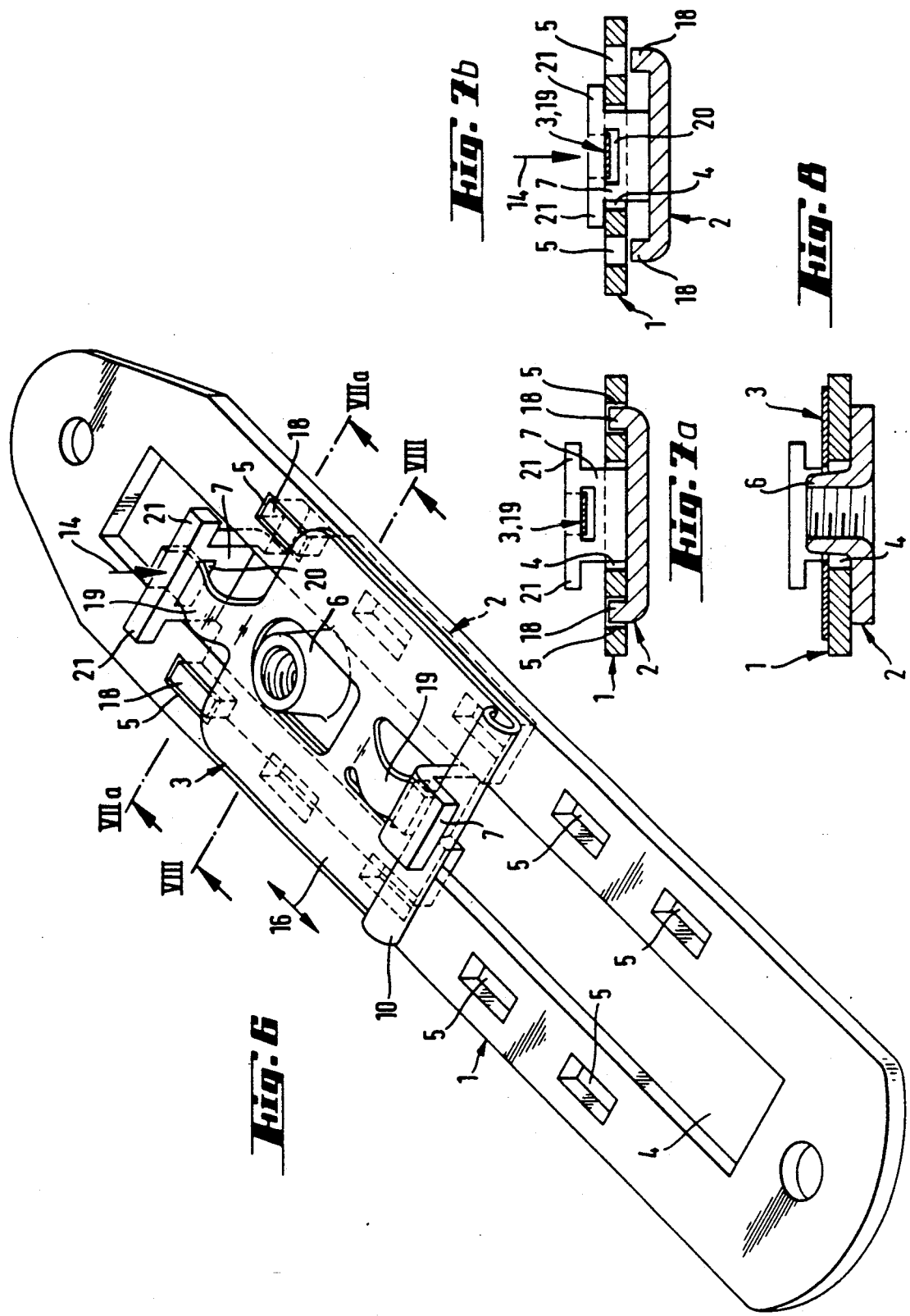

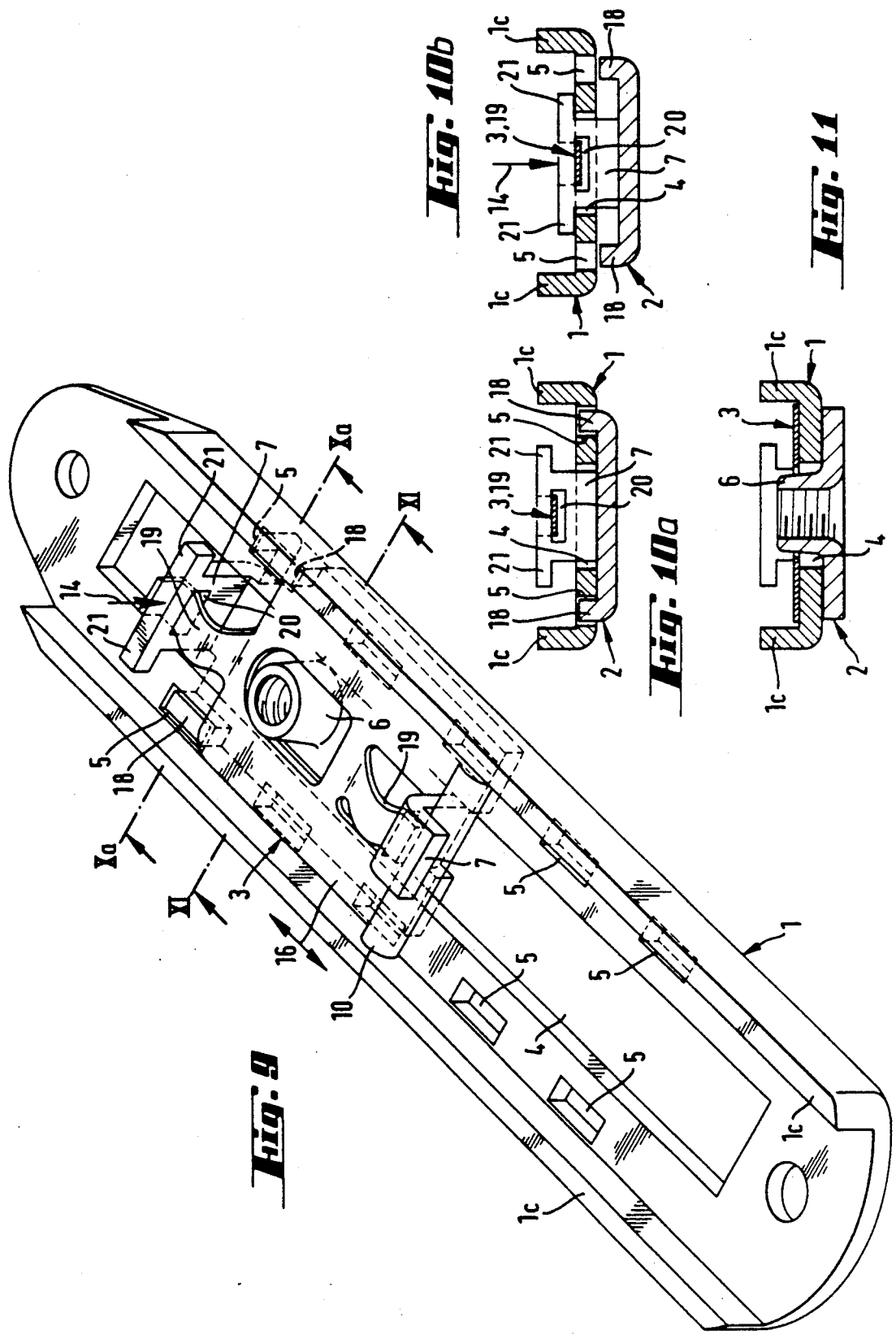

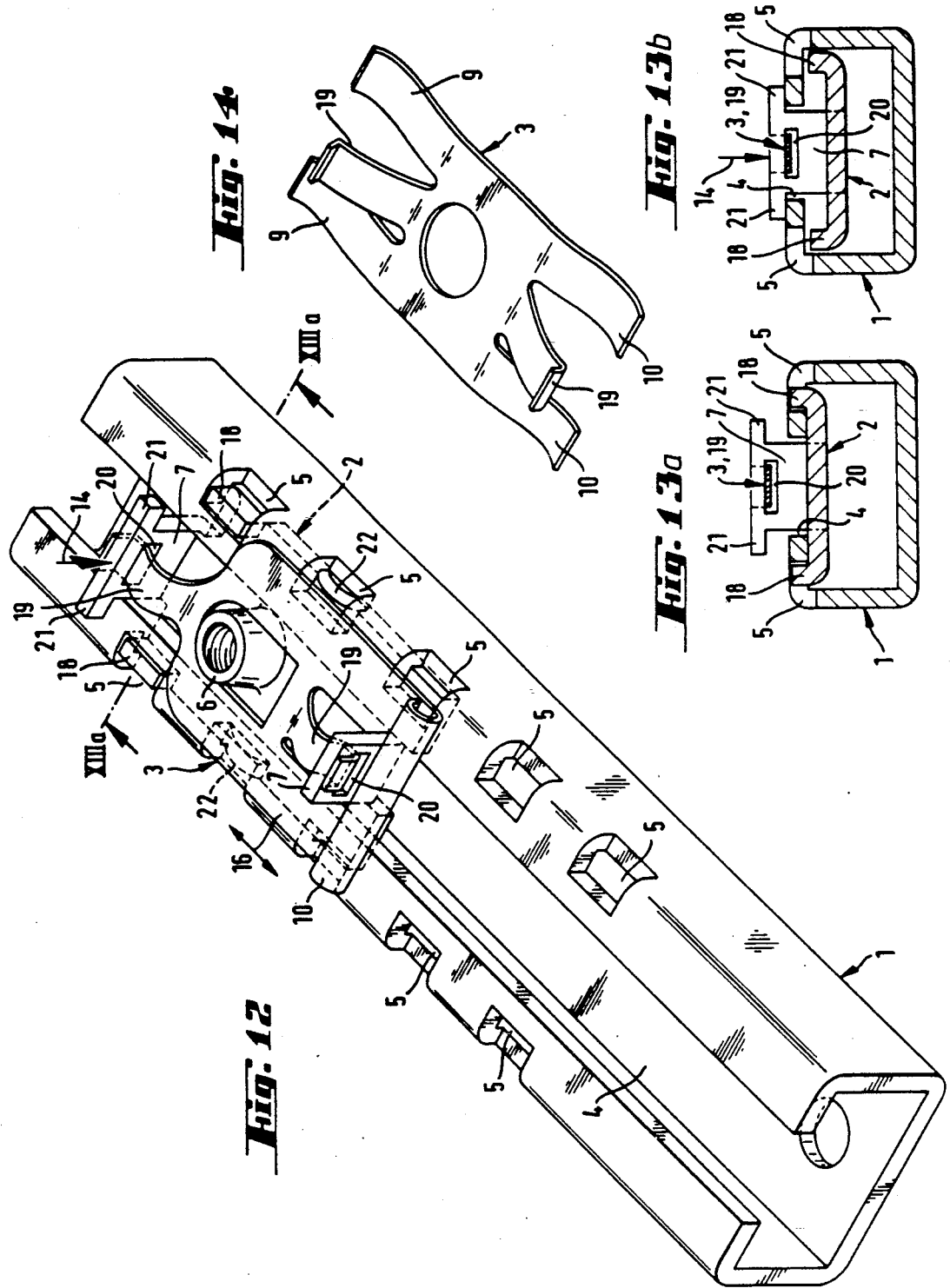

DEVICE FOR THE INCREMENTAL HEIGHT ADJUSTMENT OF AN ATTACHMENT OR DEFLECTION POINT FOR A SAFETY BELT

BACKGROUND OF THE INVENTION

1. Field of the Invention

The present invention relates to a device for the incremental height adjustment of an attachment or deflection point for a safety belt or the like. In particular, the present invention utilizes a leaf spring member combined with the adjustment element into one module clamped to a guide bar. The improvement of the present invention allows a construction with fewer pieces and thus, less cost.

2. Background and Summary of the Invention

Devices serving similar purposes have been well known in the prior art. Aside from some very complicated designs, such devices essentially comprise three modules, namely, a guide bar, an adjustment element and a spring element. The adjustment element is designed in such a way that it is maintained and guided on, or even in, the guide bar. Up to now this could only be done by giving it a specific shape. For example, adjustment elements in the shape of a sleeve surrounding the guide bar are known in connection with flat as well as channel-like guide bars as disclosed in U.S. Pat. No. 4,640,550 to Hakansson. Furthermore, flat adjustment pieces are known which only derive fixation and guidance in connection with a separate complementary piece or further connecting piece, for example a belt deflection (see German Published, Non-examined Patent Application DE-OS 36 18 973). With all this, the singular function of the spring element is to maintain a desired arresting position.

Limitation to only the said three modules surely already is an important step in the direction of efficient production and assembly. In spite of this, however, the design of the adjustment element, if it is to operate without further connecting pieces, appears to be too complicated, or the fact that full operability can only be attained with the aid of further connecting pieces makes manufacturing and assembly expensive and cumbersome.

This is the point of departure for the present invention. Its object is to improve a device of the type mentioned above in such a way that production and assembly are made simpler and less expensive. The device is intended to be adjustable without additional connecting pieces.

This object is attained by making the spring element a leaf spring essentially extending over the length and width of the adjustment element and being combined with the adjustment element into one module clamped to the guide bar.

As shown, in accordance with the intent of the invention, the adjustment element and the spring element are to be matched to each other and connected with each other in a special way, namely into a special module. The invention assumes that the spring element, in addition to arresting purposes, can be used for other functions, i.e. for fixing and guidance of the adjustment element. The basis for this idea is the recognition that the adjustment element is not evenly stressed over its entire circumference and thus, need not have the same dimensions over its entire circumference. It is therefore sufficient to design that portion of the adjustment element, which is not tensionally stressed and which only provides an interlocking connection with the guide bar, considerably weaker and in particular with an ordinary thickness of the sheet metal. In accordance with the invention, a leaf spring is intended for this area, which is to be combined with the adjustment element into a new functional unit. In this way, the leaf spring is not only used for arresting, but additionally for fixing and guiding the adjustment element on or in the guide bar.

If the guide bar is flat, the leaf spring must be installed at the front and connected with the adjustment element in the area of the slot, which for practical reasons is done in the end sections. In the case of a channel-shaped guide bar, the leaf spring may also be disposed at the front, and alternatively, also on the back, in which case the leaf spring is then supported against the bottom of the guide bar. In each case the leaf spring is directly connected with the adjustment element and completes its shape. In this way the adjustment element can be shaped very simply at the core and in particular, can be of a flat shape. Such a shape can be achieved easily by stamping, or moderate shaping, out of customary strip steel. Connection with the leaf spring can even be made in some cases prior to pushing it on the guide bar, but in others only when placing it on the guide bar. This is in particular applicable if the leaf spring is intended to be disposed at the front of a guide bar having a slot, and the adjustment element extends through the slot with a section, for example, an extruded threaded hole (for fastening a connection piece).

According to its complex tasks, the leaf spring may have areas or sections bent or prestressed in different ways, in particular those which are used for support and guidance along the guide bar and those which are used as an (elastic) connection to the adjustment element. Otherwise, the connection can be removable or fixed, which has no effect on the operation of the invention.

For practical reason, the adjustment element has at the beginning and/or end an edge or the like extending through the slot to connect it with the leaf spring. Advantageously, the edge has a slit or the like to receive a strip-like end section of the leaf spring.

According to another proposal, the edge is provided with a retaining stud or the like for clamping an end section of the leaf spring.

In a further embodiment of the idea of the invention, the edge has lateral extensions beyond the slot. The proposed extensions act as stops, during crosswise movements for disengaging the adjustment element and in the course of deformation of the guide bar in case of an impact. Thus, the extensions have the dual function of a limitation of lift in the normal case and of a stabilizer in the case of an accident. Guide surfaces may be provided on the adjustment element to insure smoother operation.

The foregoing and other advantages of this invention will become apparent to those skilled in this art as consideration is given to the following detailed description taken in conjunction with the accompanying drawings.

BRIEF DESCRIPTION OF THE DRAWINGS

FIG. 1 is a frontal view of a device with a flat guide bar according to one embodiment of the invention;

FIGS. 2a and 2b are enlarged side view of a portion of the subject of FIG. 1 showing two different positions of the adjusting element;

FIG. 3 is a perspective view of a somewhat modified embodiment;

FIG. 4a is a section of the device of FIG. 3 along the line IVa—IVa in the locked position;

FIG. 4b is a view of the same device as in FIG. 4a, but taken out of the locked position;

FIG. 5 is a section of the device of FIG. along the line V—V;

FIG. 6 is a perspective view of a further embodiment of the invention;

FIG. 7a is a section of the device of FIG. 6 along the line VIIa—VIIa, in the locked position;

FIG. 7b is a view of the same device as in FIG. 7a, but taken out of the locked position;

FIG. 8 is a section of the device of FIG. along the line VIII—VIII;

FIG. 9 is a perspective view of a still further embodiment;

FIG. 10a is a section of the device of FIG. 9 along the line Xa—Xa, in the locked position;

FIG. 10b is a view of the same device as in FIG. 10a, but taken out of the locked position;

FIG. 11 is a section of the device of FIG. 9 along the line XI—XI;

FIG. 12 is a perspective view of another embodiment of the invention with a channel-like guide bar;

FIG. 13a is a section of the device of FIG. 12 along the line XIIIa—XIIIa, in the locked position;

FIG. 13b is a view of the same device as in FIG. 13a, but taken out of the locked position;

FIG. 14 is a perspective view of a somewhat differently formed spring element, such as can be also used;

DETAILED DESCRIPTION OF THE PREFERRED EMBODIMENTS

Figure 15:
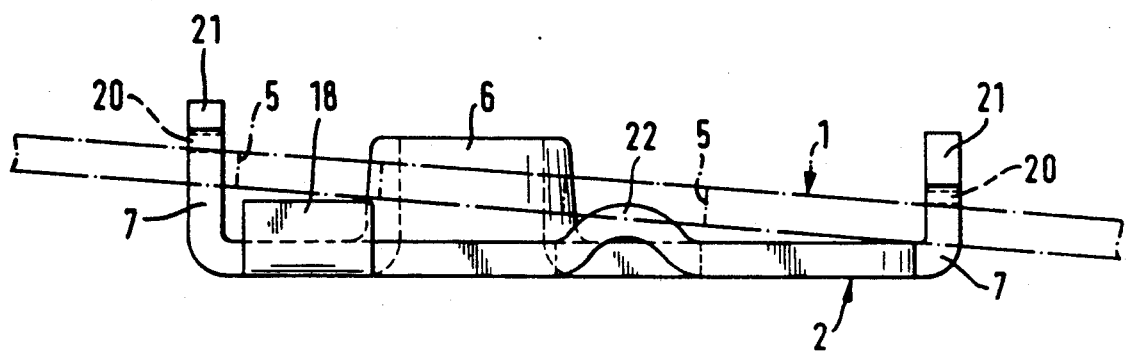
FIG. 15 is an enlarged side view of a somewhat different adjustment element, namely with additional extensions and additional guide surfaces.

In accordance with FIGS. 1, 2a and 2b, an adjustment element 2 is disposed on the back 1a of a flat guide bar 1, which essentially is also flat or, more precisely, approximately U-shaped with only short arms 2a. Each adjustment element 2 is connected with a leaf spring 3, which is placed upon the front of the guide bar 1. The leaf spring 3 approximates in its length and width the adjustment element 2. Together they form a module which is clamped to the guide bar 1. Furthermore, the guide bar 1 has a slot 4 extending symmetrically to the axis. Recesses 5 are disposed on the slot 4 to the right and left, each at the same height. The adjustment element 2 has on its front an extruded threaded hole 6, and a protruding edge 7, extending through a slit 8 in the upper end section 9 of the leaf spring 3 which assures secure fastening by means of an angled end. The lower section 10 of the leaf spring 3 is connected with the adjustment element 2 in a somewhat different fashion, namely by means of a screw 11. Otherwise the leaf spring 3 is partially placed laterally around the arms 2a of the adjustment element 2, so that the module thus formed has the approximate shape of a sleeve and can be clamped to the guide bar 1.

In FIG. 2a, the adjustment element 2 tightly abuts against the guide bar 1, as does the lower end section 10 of the leaf spring 3, while the upper end section 9 slightly projects from the guide bar 1. In the position shown, the adjustment element 2 is in the locked position, in that it engages with two retaining studs 18, located at the end 12 of the adjustment element 2 in two recesses 5 (obscured by the upper end section 9 of the leaf spring 3). Here, the adjustment element 2 is elastically maintained in this arresting position with the aid of elastic legs or elastic strips 13, stamped out of the leaf spring 3 and bent against the side 1b of the guide bar 1. In this way the leaf spring 3 here acts as a spring part for securing the locked position.

As further shown in FIG. 2a, there is a free space 23 between the bent end of the edge 7 and the guide bar 1. The end 12 of the adjustment element 2 can be moved by the action of a force operating in the direction of the arrow 14. The adjustment element 2 turns or rotates around its lower end 15. This movement crosswise to the actual direction of displacement takes the retaining studs 18 of the adjustment element 2 out of engagement with the recesses 5, thus disengaging the adjustment element and subsequently allowing the module, comprising adjustment element 2 and leaf spring 3, to perform a longitudinal movement in the actual direction of displacement in accordance with the double arrow 16 in FIG. 2b.

In accordance with FIGS. 3 to 5, upright edges 7 may also be used for connecting the leaf spring 3 and the adjustment element 2, on which the leaf spring 3 can be slipped by means of corresponding slits in its end sections. Each of the edges 7 has a retaining lip 17, which prevents unintentional disengagement. To lock the adjustment element 2 in regard to the guide bar 1, retaining studs 18 are used, which alternately can be brought into engagement with a recess 5 (see FIG. 4a) or can be disengaged therefrom by pressing down the module formed from adjustment element 2 and leaf spring 3 in the direction of arrow 14 (see FIG. 4b). Of course, it is also possible to design and associate the recesses 5 and the retaining studs 18 with each other in any other way.

In accordance with FIGS. 6 to 8, the leaf spring 3 may, for example, also have strip-like spring arm end sections 19 for connection with the adjustment element 2, which engage slits 20 in the edges 7 of the adjustment element 2 and in which are secured in this position, in particular by bending their free ends. Independently thereof, the remaining end sections, such as the lower end section 10, in this case, may have a different shape, which may, for example, be rolled up. Stability and cohesion can be improved by means of this. Furthermore, in the exemplary embodiment shown, an edge 7 has lateral extensions 21, which normally act as lift limitation (see FIG. 7b) and, in case of accident, as stabilizers to prevent the excessive bending open of the guide bar 1.

For the further exemplary embodiment in accordance with FIGS. 9 to 11 similar conditions apply. In the latter, the guide bar 1 in particular is shaped somewhat differently, in that it has bent up, longitudinal edges to protect the movable module consisting of adjustment element 2 and leaf spring 3. As also shown in this example, the idea of the invention can be realized in many forms.

In accordance with FIGS. 12 to 13b, the guide bar 1 can also be in the form of a channel and have a continuous slit 4 instead of a slot. The module made of adjustment element 2 and spring leaf 3 can be disposed and connected as before. However, with this shape of the guide bar there is the alternative possibility to dispose the leaf spring behind the channel and with the adjustment element in it where, connected with the adjustment element, it serves as its support and guide, in addition to its further function of securing a selected locking position.

FIG. 14 makes clear that the leaf spring 3 can have various shapes, namely, besides strip-like end sections 19 for connection with the adjustment element 2, also strip-like designed upper and lower end sections 9, 10 used for sliding on the guide bar 1.

Figure 16:
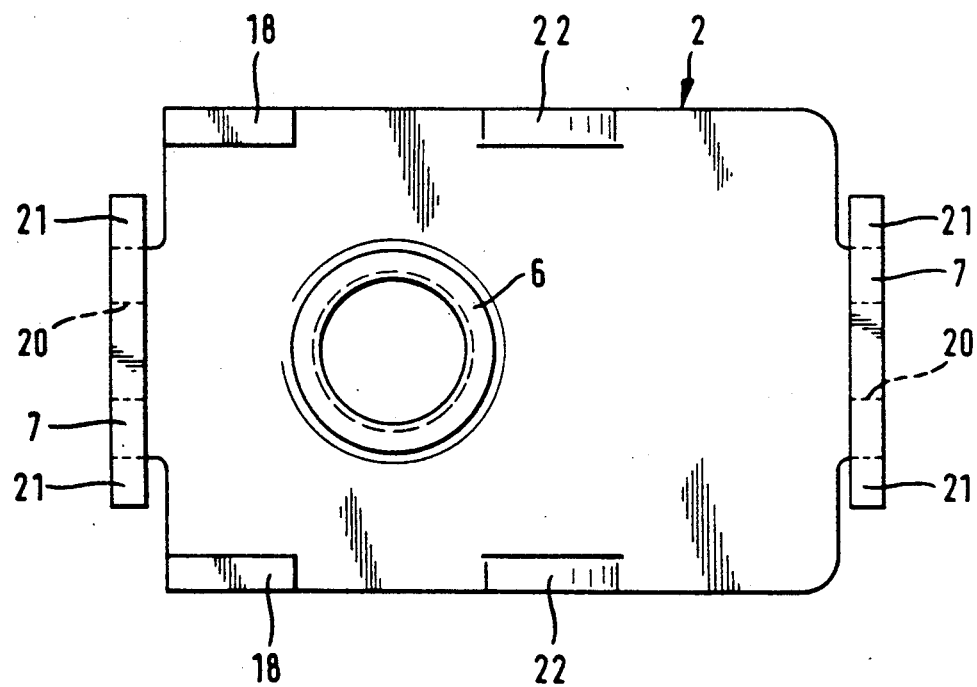
FIG. 16 is a top view of the device of FIG. 15.

Finally, it is shown in FIGS. 15 and 16, that the adjustment element 2 also can have various shapes. In particular, extensions 21 may be provided on all edges 7. Depending on their distance from the guide bar 1, these extensions 21 act as lift limiters and stabilizers or only as stabilizers. Furthermore, in addition to the retaining studs 18, guide surfaces 22 are provided on the adjustment element 2 shown. The latter are disposed in the central area of the adjustment element 2, have a rounded profile when looked at from the side and which also cooperate with the recesses of the guide bar. Said guide surfaces 22 ease the sliding of the adjustment element 2, i.e. the module formed of adjustment element 2 and leaf spring 3, in a surprisingly advantageous way. Sliding is smoother and unwanted slippage out of the locking position is minimized. The guide surfaces 22 aid in effortless sliding and finding of the desired locking position.

What is claimed is:

1. A device for the incremental adjustment of a safety belt, comprising;
   a guide track with a slot extending along a portion of the guide track length and recesses formed at increments along said track;
   an adjustment element slidably disposed on one side of said guide track;
   retaining means provided on a side of said adjustment element facing said guide track positioned so as to engage with said recesses when said adjustment element is brought into contact with said guide track, thus locking said adjustment element from sliding along said guide track; and
   a separate leaf spring element extending essentially over the length and width of said adjustment element and connected with said adjustment element to form a clamping module on said guide track, positioned so as to hold said adjustment element in contact with said guide track;
   wherein said adjustment element comprises at least one protruding portion extending through said slot to secure said adjustment element to said leaf spring element;
   and at least one slit is provided on said leaf spring element for engaging said protruding portion.

2. A device for the incremental adjustment of a safety belt, comprising;
   a guide track with a slot extending along a portion of the guide track length and recesses formed at increments along said guide track;
   an adjustment element slidably disposed on one said of said guide track;
   retaining means provided on a side of said adjustment element facing said guide track positioned so as to engage with said recesses when said adjustment element is brought into contact with said guide track, thus locking said adjustment element from sliding along said guide track; and
   a leaf spring element extending essentially over the length and width of said adjustment element and connected with said adjustment element to form a clamping module on said guide track, positioned so as to hold said adjustment element in contact with said guide track, said adjustment element including at least one protruding portion extending through said slot to secure said adjustment element to said leaf spring element, said protruding portion being provided with a slit for receiving a strip-like end section of said leaf spring element.

3. A device for the incremental adjustment of a safety belt, comprising;
   a guide track with a slot extending along a portion of the guide track length and recesses formed at increments along said track;
   an adjustment element slidably disposed on one side of said guide track;
   retaining means provided on a side of said adjustment element facing said guide track positioned so as to engage with said recesses when said adjustment element is brought into contact with said guide track, thus locking said adjustment element from sliding along said guide track; and
   a separate leaf spring element extending essentially over the length and width of said adjustment element and connected with said adjustment element to form a clamping module on said guide track, positioned so as to hold said adjustment element in contact with said guide track, said adjustment element including at least one protruding portion extending through said slot to secure said adjustment element to said leaf spring element, at least one of a slit being formed on said protruding portion for receiving a strip-like end section of said leaf spring element, and a retaining lip being formed on said protruding portion for securing said leaf spring element to said adjustment element, and a plurality of lateral extensions being formed on said protruding portion so as to extend along the width of said guide track beyond the width of said slot.

4. A device for the incremental adjustment of a safety belt, comprising;
   a guide track with a slot extending along a portion of the guide track length and recesses formed at increments along said track;
   an adjustment element slidably disposed on one side of said guide track;
   retaining means provided on a side of said adjustment element facing said guide track positioned so as to engage with said recesses when said adjustment element is brought into contact with said guide track, thus locking said adjustment element from sliding along said guide track; and
   a separate leaf spring element extending essentially over the length and width of said adjustment element and connected with said adjustment element to form a clamping module on said guide track, positioned so as to hold said adjustment element in contact with said guide track;
   wherein said adjustment element comprises:
   at least one protruding portion extending through said slot to secure said adjustment element t said leaf spring element; and
   a retaining lip formed on said protruding portion for securing said leaf spring element to said adjustment element by engaging an outer surface of said leaf spring element.

5. A device for the incremental adjustment of a safety belt, comprising;
   a guide track with a slot extending along a portion of the guide track length and recesses formed at increments along said track;

an adjustment element slidably disposed on one side of said guide track;

retaining means provided on a side of said adjustment element facing said guide track positioned so as to engage with said recesses when said adjustment element is brought into contact with said guide track, thus locking said adjustment element form sliding along said guide track; and a separate leaf spring element extending essentially over the length and width of said adjustment element and connected with said adjustment element to form a clamping module on said guide track, positioned so as to hold said adjustment element in contact with said guide track;

wherein guide surface elements separate from said retaining means are provided on a surface of said adjustment element facing said guide track which are engageable with said recesses so as to allow smooth disengaging of said retaining means from said recesses when said adjustment element is moved away from said guide track during adjustment.

* * * * *